(12) United States Patent
Matsunaga

(10) Patent No.: US 10,314,268 B2
(45) Date of Patent: Jun. 11, 2019

(54) LOW POTASSIUM CONTENT VEGETABLE, AND METHOD FOR CULTIVATING SAME

(71) Applicant: Matsunaga Plant Laboratory Co., Ltd., Tokyo (JP)

(72) Inventor: Shigeru Matsunaga, Fukushima (JP)

(73) Assignee: MATSUNAGA PLANT LABORATORY CO., LTD., Tokyo (JP)

( * ) Notice: Subject to any disclaimer, the term of this patent is extended or adjusted under 35 U.S.C. 154(b) by 385 days.

(21) Appl. No.: 15/121,169

(22) PCT Filed: Feb. 27, 2015

(86) PCT No.: PCT/JP2015/055836
§ 371 (c)(1),
(2) Date: Aug. 24, 2016

(87) PCT Pub. No.: WO2015/129854
PCT Pub. Date: Sep. 3, 2015

(65) Prior Publication Data
US 2017/0006816 A1    Jan. 12, 2017

(30) Foreign Application Priority Data
Feb. 27, 2014    (JP) ................. 2014-036174

(51) Int. Cl.
*A01G 22/00* (2018.01)
*A01H 5/12* (2018.01)
(Continued)

(52) U.S. Cl.
CPC .............. *A01H 5/12* (2013.01); *A01G 22/00* (2018.02); *A01G 31/00* (2013.01); *C05D 1/00* (2013.01); *C05G 3/0076* (2013.01)

(58) Field of Classification Search
CPC ........ A01G 22/00; C05D 1/00; C05G 3/0076; A01H 5/12
(Continued)

(56) References Cited

U.S. PATENT DOCUMENTS 6,609,331 B1 * 8/2003 Stamp .................. C05F 5/002
47/1.1
2012/0076873 A1 * 3/2012 Sugiyama .............. A23L 7/152
424/725
(Continued)

FOREIGN PATENT DOCUMENTS

JP    2008-061587    3/2008
JP    2011-036226    2/2011
(Continued)

OTHER PUBLICATIONS

European Search Report dated Sep. 22, 2017, 8 pages.
(Continued)

*Primary Examiner* — Monica L Williams
(74) *Attorney, Agent, or Firm* — Rankin, Hill & Clark LLP

(57) ABSTRACT

Provided is a method for cultivating low potassium leafy vegetables at high yield without causing growth failure due to potassium deficiency in hydroponics. Cultivation is performed using a hydroponic solution containing a very small amount of potassium in the late cultivation period of low potassium leafy vegetables, thereby keeping the potassium content low at the time of harvest and also allowing the leafy vegetables to be stably harvested at high yield without causing potassium deficiency.

13 Claims, 1 Drawing Sheet

(51) Int. Cl.
*A01G 31/00* (2018.01)
*C05D 1/00* (2006.01)
*C05G 3/00* (2006.01)

(58) Field of Classification Search
USPC ......................................................... 426/615
See application file for complete search history.

(56) References Cited

U.S. PATENT DOCUMENTS

| 2015/0223417 | A1* | 8/2015 | Matsunaga | ............ | A01G 31/00 |
| | | | | | 426/615 |
| 2017/0006816 | A1* | 1/2017 | Matsunaga | ............ | A01G 31/00 |
| 2017/0223901 | A1* | 8/2017 | Motoyama | ............... | A01G 7/00 |

FOREIGN PATENT DOCUMENTS

| JP | 2011-135797 | 7/2011 |
| JP | 2012-183062 | 9/2012 |
| WO | 2014/054821 | 4/2014 |

OTHER PUBLICATIONS

International Search Report, dated May 26, 2015 (May 26, 2015).
Chinese Office Action dated Feb. 19, 2019, English translation included, 17 pages.

\* cited by examiner

STEP FOR CULTIVATING LOW POTASSIUM LEAFY VEGETABLES

CONVENTIONAL STEP FOR CULTIVATING LOW POTASSIUM LEAFY VEGETABLES

LOW POTASSIUM CONTENT VEGETABLE, AND METHOD FOR CULTIVATING SAME

TECHNICAL FIELD

The present invention relates to low potassium containing leafy vegetables and methods for cultivating the same. Particularly, the present invention relates to a low potassium lettuce and a method for cultivating the same.

BACKGROUND ART

Recently, cultivation of low potassium vegetables are spotlighted as high added value vegetables cultivated at plant factories. The number of patients being restricted to intake potassium by the doctor, for example, artificial dialysis patients, chronic nephropathy patients, or the like, is said to be about 300,000 in Japan, and the potential demand for low potassium vegetables has been high. As such, it is conceived that low potassium vegetables are attracting attention.

As potassium has long been known as one of the three major nutrients for plants, it is essential for the plant growth and is always contained in vegetables. For this reason, supply of vegetables having low potassium content is desired by patients under potassium intake restriction and medical personnel.

Up to now, methods far cultivating low potassium spinach and other leafy vegetables have been disclosed as the methods for providing vegetables having low potassium content e.g., Patent Literatures 1 to 3).

According to the prior art literatures, low potassium containing vegetables were made available by cultivating with potassium containing hydroponic solution, and subsequently cultivating with potassium-free hydroponic solution which does not contain potassium but includes sodium instead or cultivating with hydroponic solution not including potassium or sodium. For example, the following Patent Literature 1 discloses a method for cultivating low potassium spinach by specifying the periods during which the spinach is cultivated with potassium containing hydroponic solution and potassium-free hydroponic solution.

CITATION LIST

Patent Literature

Patent Literature 1: Japanese Patent Application Laid-Open No. 2008-61587
Patent Literature 2: Japanese Patent Application Laid-Open No. 2011-36226
Patent Literature 3: Japanese Patent Application Laid-Open No. 2012-183062

SUMMARY OF INVENTION

Problem to be Solved by the Invention

The methods disclosed in the above prior art literatures succeeded in cultivating a low potassium containing vegetable at a laboratory level, however, when cultivated in large scale hydroponics as in a plant factory, leafy vegetables having low potassium content could not be stably yielded although the cultivation conditions was faithfully reproduced.

In the hydroponics of low potassium vegetables recited in the above prior art literatures, hydroponics solution in which sodium is replaced with potassium is used for cultivation during the later part of the cultivation period. However, as described above, since potassium is one of the three major nutrients for plants and is an essential nutrient for the growth of the plant, there were many cases where growth disorder occurred due to potassium deficiency such as discoloration of the leaf, root rot, and the like, and only vegetables inferior in weight, height, and the like could be harvested, leading to production of defective products which do not satisfy the shipping standard.

For example, in the case of leaf lettuce, when cultivated using potassium-free hydroponic solution, growth disorder was caused such as decrease of plant height and weight at the time of harvest, and due to yellowing or the like of the leaf, about several to several ten's of percent of defective products were produced.

Thus, in large scale hydroponics, it is necessary not only to constantly maintain the potassium value of the harvested vegetables to a low value of about ⅓ to ¼ of the normal cultivation, but also how to reduce the defective products which do not satisfy the shipping standard related to height or weight, yellowing of the leaf, has been an important subject from the view point of productivity.

Solution to Problem

The present invention is a method for cultivating a low potassium leafy vegetable, wherein a leafy vegetable is cultivated with potassium containing hydroponic solution for a certain period of time, and subsequently cultivated instead with low potassium cultivation period hydroponic solution containing potassium.

Conventionally, when cultivating a low potassium leafy vegetable, cultivation using hydroponic solution which does not including potassium at all was performed in the later part of the hydroponic cultivation period. On the other hand in the present invention, a small amount of potassium is included in the later cultivation period. According to this cultivation method, the potassium amount included in the vegetable is suppressed to a low value, while no potassium deficiency in weight, height, or yellowing of the leaf is caused.

The present invention is a method for cultivating a low potassium leafy vegetable including cultivating a leafy vegetable with potassium containing hydroponic solution for a certain period of time, and subsequently cultivating instead with a low potassium cultivation period hydroponic solution, wherein the low potassium cultivation period hydroponic solution contains potassium of 5 to 50 ppm.

Conventionally, when cultivating a low potassium leafy vegetable, the hydroponic solution used in the later cultivation period did not include any potassium, and a hydroponic solution containing sodium was used instead. However, there were many cases where growth disorder due to potassium deficiency such as discoloration of the leaf and root rot was caused. Although the leafy vegetables having potassium deficiency have low potassium amount, they could not be sold as a product not only because of the yellowing of the leaf but also for insufficient weight and height.

Moreover, it has been attempted to harvest before potassium deficiency occurred in the vegetable by shortening the period of cultivating using potassium-free hydroponic solution. By shortening the later part of the cultivation period using the potassium-free hydroponic solution, although shortage of weight and height was less likely to be seen, there was a problem that the potassium amount in the vegetable could not be stably kept to a low value.

In this regard, the cultivation condition which enables realization of a stable low potassium level in large scale hydroponics, and also which does not cause growth disorder due to potassium deficiency, thereby enabling to ship as high quality leafy vegetables, was studied. As a result, by positively including a very small amount of potassium in the hydroponic solution used in the later period of the cultivation, in which conventionally no potassium was contained at all, a cultivation condition which does not cause potassium deficiency while the potassium value at the time of harvest can be stably kept to a low concentration, was found.

Although it may differ depending on the cultivar or the management practice of the solution, by cultivating using the hydroponic solution prepared to contain potassium of 5 to 50 ppm, it was found that a low potassium vegetable with stable quality could be cultivated. With such concentration, the leafy vegetable at the time of harvest can keep a low potassium state, not only without causing growth disorder such as yellowing of the leaf or the like, but also enabling to harvest a product sufficient in plant height, weight, and the like.

When the potassium concentration is less than 5 ppm, the frequency of causing growth disorder due to potassium deficiency is high, and when the potassium concentration is more than 50 ppm, there are cases where the potassium value of the leafy vegetable at the time of harvest becomes high.

In the method for cultivating a low potassium leafy vegetable according to the present invention, the low potassium cultivation period hydroponic solution further contains sodium of 20 to 400 ppm.

Even by cultivating during the low potassium cultivation period using hydroponic solution added with sodium of 20 to 400 ppm which partly replaces the potassium, the sodium value of the cultivated product does not increase so much.

When the sodium concentration is less than 20 ppm, there is no effect of replacing potassium with sodium, and potassium deficiency such as root rot or the like is promoted.

On the other hand, when the sodium concentration is more than 400 ppm, the sodium concentration in the product becomes unnecessarily high, and there is a possibility of causing excessive burden to patients inferior in kidney function.

In the method for cultivating a low potassium leafy vegetable according to the present invention, an EC value of the hydroponic solution is adjusted to 0.5 to 1.8 for cultivation throughout a potassium containing cultivation period and a low potassium cultivation period.

Generally, leafy vegetables are cultivated at an EC value of about 2.2 to 3.0. However, in the cultivation of a low potassium leafy vegetable, by cultivating under a condition in which the EC value is consistently low, that is, under a condition in which the salt concentration as the fertilizer is low, potassium deficiency such as growth disorder or discoloration of the leaf is not caused.

In the method for cultivating a low potassium leafy vegetable according to the present invention, pH of the hydroponic solution is adjusted to 5.0 to 7.0 throughout a potassium containing cultivation period and a low potassium cultivation period.

When the pH of the hydroponic solution is within the range of 5.0 to 7.0, the composition of the hydroponic solution becomes stable since the solubility of all fertilizer base is good. As a result, the quality of the leafy vegetable at the time of harvest also becomes stable.

In the method for cultivating a low potassium leafy vegetable according to the present invention, the EC value and pH of the hydroponic solution are continuously adjusted to be constant throughout an entire cultivation period.

It is important to cultivate while constantly monitoring the EC value and pH in order to maintain the condition of the hydroponic solution constant, and to cultivate leafy vegetables with stable quality.

In the method for cultivating a low potassium leafy vegetable according to the present invention, a cultivation period with the low potassium cultivation period hydroponic solution is set to 10 to 17 days.

Although it may differ depending on the type of the leafy vegetable to be cultivated, the cultivation period of 10 to 17 days allows to stably obtain a vegetable with low potassium content and with a sufficient size such as the weight, the height, and the like at the time of harvest.

In a leafy vegetable cultivated by a hydroponic cultivation method according to the present invention, potassium content at a time of harvest is 30% or less of that of a leafy vegetable cultivated without adjusting a potassium level.

By cultivating using the hydroponic solution in which the potassium level is strictly adjusted according to the present invention, it is able to obtain a leafy vegetable containing potassium of only 30% or less of the same kind of leafy vegetable in which the potassium level is not adjusted.

If the low potassium leafy vegetable can be obtained according to the cultivation method of the present invention, even renal disease patients who are required to restrict the potassium intake amount can take leafy vegetables into their eating habits at ease.

In a low potassium cultivation period hydroponic solution of a low potassium leafy vegetable according to the present invention, potassium of 5 to 50 ppm is contained in the hydroponic solution during a low potassium cultivation period.

As described above, by containing potassium of 5 to 50 ppm in the hydroponic solution during the low potassium cultivation period which is the later part of the cultivation period, potassium deficiency is not caused and low potassium leafy vegetable with stable amount and quality can be harvested.

In the low potassium cultivation period hydroponic solution of a low potassium leafy vegetable according to the present invention, sodium of 20 to 400 ppm is contained.

When cultivating a low potassium vegetable, normally sodium is fed in place of potassium. In the present invention, also in addition to the small amount of potassium, sodium is fed to replace a part of the potassium, and the concentration of the sodium is appropriately 20 to 400 ppm. When the substitution of the sodium is less than 20 ppm, the potassium deficiency is resolved and the effect for promoting growth cannot be observed. Moreover, when the concentration of the sodium is more than 400 ppm, the sodium concentration in the product becomes unnecessarily high, and there is a possibility of causing excessive burden to patients inferior in kidney function.

BRIEF DESCRIPTION OF DRAWINGS

FIG. 1A and FIG. 1B schematically show cultivation methods, in which FIG. 1A shows a cultivation method of a low potassium leafy vegetable of the present invention and FIG. 1B shows a conventional cultivation method of a low potassium leafy vegetable.

DESCRIPTION OF EMBODIMENTS

FIG. 1 schematically shows a cultivation method of a low potassium leafy vegetable. Seeds of a leafy vegetable are immersed in water. In the case of leaf lettuce, the seed immersion period is 2 to 3 days. The water used may be tap water. After the seed immersion of the leaf lettuce, the germination and rooting is confirmed, and the cultivation is carried out for a certain period of time using potassium containing hydroponic solution A. In the potassium containing cultivation period, general cultivation conditions can be used, and it is preferable to appropriately set the conditions depending on the cultivation conditions such as the type of leafy vegetable to be cultivated, the irradiated light, temperature, or the like.

In the potassium containing cultivation period, for example, hydroponic solution used in Patent Literature 1 and 2 may be used, or fluid fertilizer generally sold as hydroponic solution may be used. When cultivating the leaf lettuce, it is preferable that a hydroponic solution containing potassium of 110 to 315 ppm, more preferably, 110 to 220 ppm, is used as the hydroponic solution A of the potassium containing period. Moreover, it is preferable that the hydroponic solution A contains nitrogen of 80 to 120 ppm as total nitrogen quantity and phosphoric acid of 40 to 50 ppm.

Here, a hydroponic solution containing trace element such as manganese, iron, boron, copper, zinc, or the like in the hydroponic solution having a concentration of total nitrogen quantity of 95 ppm, phosphoric acid of 50 ppm, and potassium of 210 ppm, is used as the hydroponic solution A.

Figure 1A:
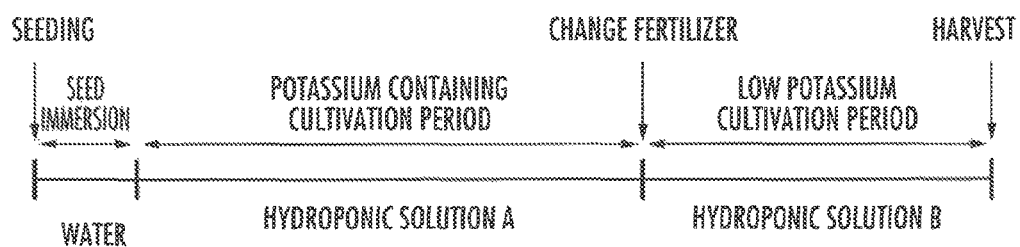
Figure 1B:
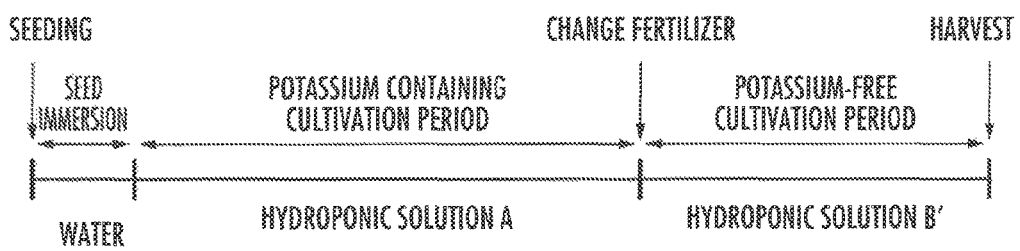

Conventionally, as shown in FIG. 1B, after the leafy vegetable grew to a certain plant height in the potassium containing hydroponic solution, the low potassium leafy vegetable was cultivated by using potassium-free hydroponic solution B' in which $NaNO_3$ or $HNO_3$ was added in place of $KNO_3$.

On the other hand, as shown in FIG. 1A, in the present invention, hydroponic solution B includes a small amount of potassium, and has a composition in which a part of the shortage of the potassium being replaced with sodium. That is, a low potassium cultivation period hydroponic solution is used in place of the conventional potassium-free hydroponic solution used in the later part of the cultivation period of low potassium leafy vegetable. By adding a small amount of potassium, the potassium value of the product at the time of harvest is kept low, while growth disorder due to potassium deficiency is not caused (see FIG. 1A).

Hereinafter, the present invention is explained in details by showing the Embodiment, however the present invention is not limited thereto.

1. The Cultivation Condition of the Low Potassium Cultivation Period

The seeds of the leaf lettuce were immersed using tap water, and from 3 days later, the leaf lettuce was cultivated with the potassium containing hydroponic solution A for 26 days. Subsequently the leaf lettuce was cultivated by changing the hydroponic solution to low potassium cultivation period hydroponic solution B containing $KNO_3$ of 9 to 30 ppm as the potassium. After changing to low potassium cultivation period hydroponic solution B, depending on the scale of the hydroponics system or the plant type, the total amount of the hydroponic solution B was exchanged with new hydroponic solution B by every predetermined period. For example, the total amount of the hydroponic solution B was exchanged with new hydroponic solution B every 2 days to 10 days. The EC value was monitored and managed so that the EC value was constant during the period from the hydroponic solution exchange to the next hydroponic solution exchange.

Any culture medium used for general hydroponics may be used as the hydroponic solution A. Fertilizers having the optimum fertilizer concentration, and changed in ratio of nitrogen, potassium, and phosphoric acid can be used depending on the cultivation conditions such as the type of leafy vegetable, irradiated light, temperature, or the like. Moreover, regarding the trace element such as iron, copper, or the like, their amount may be the amount contained in general hydroponic solutions.

A hydroponic solution containing sodium of 20 to 400 ppm added in place of potassium, nitrogen of 90 to 120 ppm, phosphoric acid of 40 to 100 ppm, and in addition boron, iron, copper, zinc, and molybdenum as the trace element, may be used as the low potassium cultivation period hydroponic solution (hydroponic solution B).

Here, a hydroponic solution containing: nitrogen of 105 ppm; phosphoric acid of 100 ppm; sodium of 145 ppm; and as the trace element, magnesium, manganese, boron, copper, zinc, and molybdenum, added with potassium of the concentration of below, was used as the hydroponic solution B.

As shown in Table 1 below, the potassium value was changed to prepare the low potassium cultivation period hydroponic solution B, and the leaf lettuce was harvested after cultivated for 14 days from exchanging the hydroponic solution to the low potassium cultivation period hydroponic solution. Then, the weight and the potassium content were measured. The results are shown in Table 1.

TABLE 1

| Potassium amount in hydroponic solution (ppm) | Weight (g) | Potassium content (mg/100 g) |
|---|---|---|
| 0 | 84 | 69 |
| 9 | 89 | 88 |
| 12 | 100 | 86 |
| 15 | 100 | 130 |
| 30 | 126 | 250 |

The average potassium intake of Japanese is said to be 2300 mg/day. In contrast, the potassium intake per day of a renal disease patient who undergoes potassium restriction is restricted to 1500 mg. That is, a renal disease patient needs to restrict the intake of potassium to about 65% of that of a healthy person. Therefore, it is preferable to keep the potassium value to be 65% or less, more preferably 50% or less, or specifically preferable to keep it 30% or less of that of the fifth revised and enlarged edition of Standard Tables of Food Composition in Japan reinafter referred as Standard Tables of Food Composition in Japan in some cases).

According to the Standard Table of Food Composition in Japan, it is said that leaf lettuce (leaf fresh) contains 490 mg potassium per 100 g. In order to cultivate the leaf lettuce to have a potassium value of 65% or less of normal vegetable (319 mg/100 g), the hydroponic solution B may contain about 40 ppm potassium. Moreover, low potassium leaf lettuce containing potassium of 50% (245 mg/100 g) of normal leaf lettuce may be cultivated using hydroponic solution B containing about 30 ppm potassium, and low potassium leaf lettuce containing potassium of 30% (147 mg/100 g) of normal leaf lettuce may be cultivated using hydroponic solution B containing about 17 ppm potassium.

Generally, when lettuce is eaten as salad, normally about 30 to 50 g per meal is required. Here, if the potassium value of the low potassium lettuce is 100 mg/100 g or less which is about ⅕ of the potassium value published in the Standard Table of Food Composition in Japan, it is able to keep the potassium value to maximum 50 mg or less per meal. Therefore it becomes possible to plan the menu while suppressing the potassium intake per day to a sufficiently low value. As the cultivation condition which allows maintaining the potassium value to 100 mg/100 g or less while corresponding to a growth condition which does not cause potassium deficiency, it can be seen from the above results that a hydroponic solution containing 12 ppm or less potassium may be used.

Moreover, for example, in the case of using a hydroponic solution B containing 15 ppm potassium, even the hydroponic solution is circulated by keeping the EC value to be constant, when the circulated hydroponic solution is analyzed, the potassium was 4 ppm at 17 hours after changing the hydroponic solution, 2 ppm after 23 hours, and not able to be detected after 41 hours.

Since only a very small amount of potassium is contained, it is conceived that the plant selectively absorbs the potassium. Moreover, since the amount is very small and has no influence on the EC value, it is difficult to manage the potassium value even by monitoring the EC value. Therefore, it is preferable to exchange the hydroponic solution every 2 to 5 days depending on the cultivars. In a small test section, the total hydroponic solution is exchanged every few days, but in the actual factory line, about ⅓ to ⅕ of the hydroponic solution may be exchanged with new hydroponic solution every few days.

Here, since the cultivation is performed in a test section having a short flow passage, the potassium concentration contained in the low potassium cultivation period hydroponic solution is a relatively low value. Actually, the optimum range of the potassium value to be contained differs depending on the length of the flow passage of the system used in the hydroponics or the frequency of exchanging hydroponic solution B. In the case of using a hydroponic system of a factory with a long flow passage, it is not practical to cultivate by exchanging the hydroponic solution B every 3 days. Therefore, in the hydroponic system with a long flow passage, the low potassium leaf lettuce was cultivated by partly changing the hydroponic solution B containing 40 ppm potassium every 3 to 5 days. As a result, it was possible to harvest a lettuce having a potassium value of 100 mg/100 g or less without causing potassium deficiency. Moreover, in the case of a leaf lettuce, it was found that growth disorder due to potassium deficiency can be avoided by replacing with sodium at a concentration of 100 to 160 ppm.

On the other hand, in a case of cultivating by using a system with a short flow passage, no growth disorder was caused due to low potassium by using hydroponic solution B containing 5 ppm potassium. Therefore, when cultivating leaf lettuce, although it may differ depending on the used hydroponic system scale, it is able to harvest low potassium leaf lettuce while avoiding growth disorder due to potassium deficiency by adding 5 to 40 ppm potassium to the hydroponic solution.

In addition to leaf lettuce, the inventors also attempted the low potassium hydroponic cultivation for spinach, Japanese mustard spinach, Korean lettuce, and endive. In the case of cultivation using potassium-free hydroponic solution B', although Korean lettuce and endive did not show any yellowing of leaf apex due to potassium deficiency, spinach and Japanese mustard spinach suffered potassium deficiency. Therefore, it can be conceived that spinach and Japanese mustard spinach are vegetables having high requirement of potassium. In this regard, it is estimated that it is necessary to use low potassium cultivation period hydroponic solution B in which 10 to 50 ppm potassium is added.

2. Effect Regarding the Yield Achieved by Using the Low Potassium Cultivation Period Hydroponic Solution The potassium value of the vegetable becomes lower as the cultivation period from changing the fertilizer to the potassium-free hydroponic solution B' of the conventionally method becomes longer. However, there was a tendency that the weight of 1 root decreased. So, it was analyzed how the potassium and the weight of 1 root temporally changed after changing to the potassium-free hydroponic solution.

When the leaf lettuce was cultivated with potassium containing hydroponic solution, and thereafter changed to potassium-free hydroponic solution B', the potassium content decreased as the elapse of number of days, and became a value of 16.6% of the Standard Tables of Food Composition in Japan after 10 days, which was a sufficiently low value. However, the weight of 1 root also decreased, and a decrease of about 20% of the weight from the weight at the time of changing the fertilizer was observed at the 10th day after changing to the potassium-free hydroponic solution B'.

The decrease of weight started before the potassium value of the lettuce was sufficiently low, and it was found that about 20% of the weight decreased after 5 days, which approximately equals to the weight decrease after 10 days, from changing the hydroponic solution to potassium-free hydroponic solution B'.

The decrease of the weight per 1 root consequently leads to the decrease of the yield. Moreover, in the case of cultivating using the potassium-free hydroponic solution B', growth disorder such as yellowing of the leaf or the like was seen as described above.

Next, the influence on the weight, the plant height, or the like was analyzed in the case of cultivating using the hydroponic solution B containing a small amount of potassium as considered above.

After the cultivation using hydroponic solution A in the potassium containing cultivation period, cultivation was performed by using low potassium cultivation period hydroponic solution B containing 10 ppm potassium for 14 days, whereas also after using the same hydroponic solution A in the potassium containing cultivation period, cultivation was performed using potassium-free hydroponic solution B'. The weights and the plant heights were measured. The average weights and average plant heights of 30 roots, and the respective maximum values and the minimum values are shown in Table 2. Those cultivated according to the cultivation method of the present invention in which potassium of small mount was contained in the hydroponic solution of the later part of the cultivation period, is expressed as "low potassium", and those cultivated according to the conventional method in which no potassium was contained while all other compositions of the hydroponic solution were the same, is expressed as "potassium-free".

TABLE 2

| Cultivation method | Low potassium (hydroponic solution B) | Potassium-free (hydroponic solution B') |
|---|---|---|
| Average weight of 1 root (g) | 89.2 | 82.2 |
| Weight maximum value (g) | 109 | 104 |
| Weight minimum value (g) | 61 | 63 |
| Average plant height of 1 root (mm) | 200.7 | 188.3 |
| Plant height maximum value (mm) | 220 | 220 |
| Plant height minimum value (mm) | 170 | 160 |

As it is clear from the above results, when cultivating by using the hydroponic solution B containing 10 ppm potassium, both of the average weight and the average plant height were increased by about 7% compared to the conventional method.

Moreover, the potassium value was 57 mg/100 g when using the low potassium cultivation period hydroponic solution B, with respect to 53 mg/100 g when the potassium-free hydroponic solution B' was used, so that even when a small amount of potassium was added, it was able to obtain a value which compares nearly with those cultivated by potassium-free hydroponic solution.

Furthermore, the degree of defective products produced at the practical line was analyzed and compared. The result is shown in Table 3.

TABLE 3

| Cultivation method | Low potassium (hydroponic solution B) | Potassium-free (hydroponic solution B') |
|---|---|---|
| Defective roots/harvested roots | 0/30 | 23/989 |

In the case of cultivation using conventional potassium-free hydroponic solution, defective products of 23 roots were produced among 989 roots. The breakdown of the defective products is: the highest was pink rib 9 roots, tip bum 6 roots, poor growth 3 roots, and the rest had rotten edges or other defects.

On the other hand, regarding the 30 roots cultivated using the low potassium cultivation period hydroponic solution B in the test section, no growth disorder due to potassium deficiency was observed.

As shown above, in the cultivation of low potassium leafy vegetable, it is able to cultivate by maintaining the potassium level low at the time of harvest while suppressing potassium deficiency by cultivating the leafy vegetable with potassium containing hydroponic solution for a certain period and thereafter cultivating by changing to low potassium cultivation period hydroponic solution containing 5 to 50 ppm potassium. Moreover, since a small amount of potassium is fed at the later part of the cultivation period, those having a heavy weight per 1 root at the time of harvest can be obtained, thereby enabling a very good productivity and a stable cultivation.

The invention claimed is:

1. A method for cultivating a low potassium leafy vegetable wherein the method includes cultivating the leafy vegetable with a potassium containing hydroponic solution for a potassium containing cultivation period, and subsequently cultivating the leafy vegetable instead with a low potassium hydroponic solution during a low potassium cultivation period,
wherein the low potassium hydroponic solution contains potassium, and a concentration of potassium in the low potassium hydroponic solution is lower than a concentration of potassium in the potassium containing hydroponic solution, and
wherein an Electrical Conductivity (EC) value of the potassium containing hydroponic solution is adjusted to 0.5 to 1.8 for cultivation throughout the potassium containing cultivation period and the EC value of the low potassium hydroponic solution is adjusted to 0.5 to 1.8 for cultivation throughout the low potassium cultivation period.

2. The method for cultivating the low potassium leafy vegetable according to claim 1,
wherein the low potassium hydroponic solution contains sodium of 20 to 400 ppm.

3. The method for cultivating the low potassium leafy vegetable according to claim 1,
wherein pH of the potassium containing hydroponic solution is adjusted to 5.0 to 7.0 throughout the potassium containing cultivation period, and pH of the low potassium hydroponic solution is adjusted to 5.0 to 7.0 throughout the low potassium cultivation period.

4. The method for cultivating the low potassium leafy vegetable according to claim 1,
wherein the EC value and pH of the potassium containing hydroponic solution are continuously adjusted to be constant throughout the potassium containing cultivation period, and the EC value and pH of the low potassium hydroponic solution are continuously adjusted to be constant throughout the low potassium cultivation period.

5. The method for cultivating the low potassium leafy vegetable according to claim 1,
wherein the low potassium cultivation period is set to 10 to 17 days.

6. A leafy vegetable cultivated by the hydroponic cultivation method according to claim 1,
wherein potassium content at a time of harvest is 30% or less of that of a leafy vegetable cultivated without adjusting a potassium level.

7. The method for cultivating the low potassium leafy vegetable according to claim 1,
wherein the low potassium hydroponic solution contains potassium of 5 to 50 ppm.

8. The method for cultivating the low potassium leafy vegetable according to claim 7,
wherein the low potassium hydroponic solution contains sodium of 20 to 400 ppm.

9. The method for cultivating the low potassium leafy vegetable according to claim 7,
wherein pH of the potassium containing hydroponic solution is adjusted to 5.0 to 7.0 throughout the potassium containing cultivation period, and pH of the low potassium hydroponic solution is adjusted to 5.0 to 7.0 throughout the low potassium cultivation period.

10. The method for cultivating the low potassium leafy vegetable according to claim 7,
wherein the EC value and pH of the potassium containing hydroponic solution are continuously adjusted to be constant throughout the potassium containing cultivation period, and the EC value and pH of the low potassium hydroponic solution are continuously adjusted to be constant throughout the low potassium cultivation period.

11. The method for cultivating the low potassium leafy vegetable according to claim 7,
wherein the low potassium cultivation period is set to 10 to 17 days.

12. A low potassium cultivation period hydroponic solution used during a low potassium cultivation period of a low potassium leafy vegetable, which follows a potassium containing cultivation period,
wherein potassium of 5 to 50 ppm is contained in the low potassium cultivation period hydroponic solution, and
wherein an Electrical Conductivity (EC) value of the low potassium cultivation period hydroponic solution is 0.5 to 1.8.

13. The low potassium cultivation period hydroponic solution according to claim 12,
wherein sodium of 20 to 400 ppm is contained in the low potassium cultivation period hydroponic solution.

* * * * *